(12) United States Patent
Pick et al.

(10) Patent No.: US 8,300,651 B1
(45) Date of Patent: Oct. 30, 2012

(54) CHANNEL ESTIMATION WITH CO-CHANNEL PILOTS SUPPRESSION

(75) Inventors: Kobby Pick, Modiin (IL); Daniel Yellin, Ra'anana (IL); Yona Perets, Ra'anana (IL); Adoram Erell, Herzliya (IL)

(73) Assignee: Marvell International Ltd., Hamilton (BM)

( * ) Notice: Subject to any disclaimer, the term of this patent is extended or adjusted under 35 U.S.C. 154(b) by 948 days.

(21) Appl. No.: 12/360,545

(22) Filed: Jan. 27, 2009

Related U.S. Application Data (60) Provisional application No. 61/024,704, filed on Jan. 30, 2008.

(51) Int. Cl.
H04L 12/28 (2006.01)

(52) U.S. Cl. .................................. 370/431; 370/203

(58) Field of Classification Search .............. 370/431, 370/201, 203
See application file for complete search history.

(56) References Cited

U.S. PATENT DOCUMENTS

| | | | |
|---|---|---|---|
| 5,867,478 A * | 2/1999 | Baum et al. | 370/203 |
| 7,995,686 B2 * | 8/2011 | Chang et al. | 375/346 |
| 2002/0122470 A1 * | 9/2002 | Heikkila | 375/147 |
| 2007/0147538 A1 * | 6/2007 | Jung et al. | 375/267 |
| 2007/0183524 A1 * | 8/2007 | Moon et al. | 375/261 |
| 2008/0298524 A1 * | 12/2008 | Koorapaty et al. | 375/348 |
| 2010/0150079 A1 * | 6/2010 | Maltsev et al. | 370/329 |

OTHER PUBLICATIONS

IEEE 802.16.3c-01/29r4; Channel Models for Fixed Wireless Applications; IEEE 802.16 Broadband Wireless Access Working Group; Jul. 17, 2001; 36 pages.

3G Evolution; HSPA and LTE for Mobile Broadband; Second Edition; 2008; Erik Dahlman, Stefan Parkvall, John Skold and Per Beming; LTE access procedures; pp. 421-425.

OFDM and MC-CDMA for Broadband Multi-User Communications, WLANs and Broadcasting; L. Hanzo, M. Munster, B.J. Choi and T. Keller; All of University of Southhampton, UK; IEEE Communications Society, Sponsor; 2003; pp. 516-522.

R1-060031; 3GPP TSG-RAN WG1 LTE Ad Hoc Meeting; Helsinki, Finland, Jan. 23-25, 2006; Orthogonal Pilot Channel Structure in E-UTRA Downlink; NTT DoCoMo; 11 pages.

R1-062071; 3GPP TSG RAN WG1 Meeting #46; Tallinn, Estonia; Aug. 28-Sep. 1, 2006; Downlink reference signal sequence design; Motorola; 4 pages.

R1-072291; 3GPP TSG RAN WG1#49; Kobe, Japan; May 7-11, 2007; On timing estimation with orthogonal reference sequences; Nokia, Nokia Siemens Networks; 4 pages.

R1-072426; 3GPP TSG RAN WG Meeting #49; Kobe, Japan; May 7-11, 2007; Performance Evaluation on Orthogonal RS and Views on RS Sequence; NTT DoCoMo, Mitsubishi Electric, NEC, Sharp, Toshiba Corporation; 24 pages.

IEEE Transactions on Audio and Electroacoustics, vol. AU-15, No. 2, Jun. 1967; The Use of Fast Fourier Transform for the Estimation of Power Spectra: A Method Based on Time Averaging Over Short, Modified Periodograms; Peter D. Welch; pp. 70-73.

Rayleigh fading; Wikipedia, the free encyclopedia; Jan. 1, 2009; 5 pages.

* cited by examiner

Primary Examiner — Luat Phung (57) ABSTRACT

A method for a user equipment device includes receiving a reference signal from a desired transmitter and obtaining information about other, interfering transmitters whose signals are receivable by the user equipment. The information includes a reference signal sequence of reference signals transmitted by the other transmitters. The method also includes modeling interference caused by the reference signals of the other transmitters on the received reference signal when determining a channel estimate for a channel between the user equipment device and the desired transmitter.

26 Claims, 5 Drawing Sheets

Get a vector of RS from the same OFDM symbol
$y(n) = [y(n,0), y(n,1)...]$

Perform sqr(abs(IFFT)) to get estimate of the current taps delay spread and power
$Z(n,m) = |FFT\{y(n)\}|^2$ Perform averaging over z(n,m) to get estimate of the average taps delay spread and power $z(m) = \sum_n z(n,m)$

CHANNEL ESTIMATION WITH CO-CHANNEL PILOTS SUPPRESSION

CROSS-REFERENCE TO RELATED APPLICATIONS

This application claims benefit from U.S. Provisional Patent Application No. 61/024,704, filed Jan. 30, 2008, which is hereby incorporated in its entirety by reference.

FIELD OF THE INVENTION

The present invention relates to channel estimation generally and to such estimation in the presence of multiple reference signals (or pilots) in particular.

BACKGROUND OF THE INVENTION

In cellular communications systems, a multiplicity of base stations may be distributed throughout a geographical area. Each base station communicates with user equipment devices, such as mobile communications devices, which may move throughout an area served by the base station.

In order for a device to properly decipher signals that it receives from a base station with which it is currently communicating, the user equipment needs to know how received signals may be affected by environmental conditions and other multipath considerations. The mechanism for determining these affects is known as "channel estimation". In order to provide channel information, a base station may periodically transmit, at known times and/or at known frequencies, "pilot" signals which are defined by a known pattern of bits. Pilot signals may also be referred to as "reference signals" (RS), and these terms are used interchangeably throughout the following disclosure.

A pilot signal pattern may be based, for example, on a particular pseudo-random-noise ("PN") sequence. By comparing a received pilot pattern to an expected pilot pattern, channel qualities may be determined. The pilot pattern, in the general case, may also be based upon some scrambling/spreading sequences. Different base stations may utilize different PN sequences to facilitate identification of the base station from which a pilot signal is received.

In compliance with emerging LTE (Long Term Evolution) standards being promulgated by the 3GPP (3rd Generation Partnership Project) the pilot signals associated with each base station are transmitted in the same OFDMA (orthogonal frequency division multiple access) time/frequency bin. Thus, there may be strong interference from the reference signals transmitted by neighboring base stations (or by the multiple transmitters of a base station, if a base station has more than one transmitter).

SUMMARY

In accordance with an aspect of the present disclosure, user equipment devices may employ information about reference signal patterns that are transmitted by neighboring transmitters, which the devices determine as part of the process of switching from cell to cell, in order to account for interference by the reference signals of the neighboring transmitters on the reference signal from the desired transmitter. The desired transmitter may be the transmitter with which the user equipment device is currently communicating or with which the user equipment device is switching to communicate. The interfering transmitters may be located within the same cell or within different cells, which may neighbor the current cell or may be further away.

There is therefore provided, in accordance with an embodiment, a method for a user equipment device. The method includes receiving a reference signal from a desired transmitter, obtaining information about at least one interfering transmitter whose signals are receivable by the user equipment, where the information includes a reference signal sequence of a reference signal transmitted by its at least one interfering transmitter, and generating a channel estimate for a channel between the user equipment device and the desired transmitter from the received reference signal and the interfering transmitter information.

Alternatively, in accordance with an embodiment, the channel estimate may be generated by modeling interference caused by the reference signals of at least one interfering transmitter on the received reference signal.

Moreover, in accordance with an embodiment, the known sequence is a scrambling sequence or a spreading sequence.

Further, in accordance with an embodiment, the generating includes estimating a signal filter to filter the received reference signal thereby to produce the channel estimate.

Still further, in accordance with an embodiment, the estimating can utilize an LMMSE (linear minimum mean square error) estimator.

Additionally, in accordance with an embodiment, the estimating includes estimating a power of signals transmitted by the desired and each interfering transmitter, a noise variance and time and frequency correlation matrices, generating a channel correlation matrix from the time and frequency correlation matrices, constructing an autocorrelation matrix of the received reference signal and a cross-correlation matrix of received signal with the channel from the powers, the noise variance and the known sequences for each interfering transmitter, and generating a signal filter from the autocorrelation matrix and the cross-correlation matrix.

Further, in accordance with an embodiment, the reference signal is an OFDMA (orthogonal frequency division multiple access) signal.

Still further, in accordance with an embodiment, the user equipment device is an LTE (long term evolution) device.

Moreover, in accordance with an embodiment, the obtaining includes using the output of a neighbor cell searcher forming part of the user equipment device.

There is also provided, in accordance with an embodiment, a method including transmitting a reference signal from a desired transmitter, receiving the reference signal by a user equipment device, the user equipment device obtaining information about at least one interfering transmitter whose signals are receivable by user equipment, where the information includes a reference signal sequence of a reference signal transmitted by its at least one interfering transmitter and the user equipment device generating a channel estimate for a channel between the user equipment device and the desired transmitter from the received reference signal and the interfering transmitter information.

Alternatively, in accordance with an embodiment, the channel estimate may be generated by modeling interference caused by the reference signals of at least one interfering transmitter on the received reference signal.

There is also provided, in accordance with an embodiment, a user equipment device including a receiver, a neighbor cell searcher and an estimator. The receiver receives a reference signal from a desired transmitter and the neighbor cell searcher obtains information about at least one interfering transmitter whose signals are receivable by the device, where the information includes a reference signal sequence of a reference signal transmitted by its at least one interfering transmitter. The estimator generates a channel estimate for a channel between the user equipment device and the desired transmitter from the received reference signal and the interfering transmitter information.

Alternatively, in accordance with an embodiment, the device may include a receiver, a neighbor cell searcher and a modeler to model interference caused by the reference signals of at least one interfering transmitter on the received reference signal when determining a channel estimate for a channel between the user equipment device and the desired transmitter.

Further, in accordance with an embodiment, the estimator includes a filter estimator to estimate a signal filter to filter the received reference signal thereby to produce the channel estimate. For example, the filter estimator is an LMMSE (linear minimum mean square error) estimator.

Still further, in accordance with an embodiment, the filter estimator includes an estimator, a channel correlation generator, a matrix constructor and a filter generator. The estimator estimates a power of signals transmitted by the desired and each interfering transmitter, a noise variance and time and frequency correlation matrices. The channel correlation generator generates a channel correlation matrix from the time and frequency correlation matrices. The matrix constructor constructs an autocorrelation matrix of the received reference signal and a cross-correlation matrix of received signal with channel from the powers, the noise variance and the known sequences for each interfering transmitter. The filter generator generates a signal filter from the autocorrelation matrix and the cross-correlation matrix.

Moreover, in accordance with an embodiment, the reference signal is an OFDMA (orthogonal frequency division multiple access) signal.

Finally, in accordance with an embodiment, the user equipment device is an LTE (long term evolution) device.

BRIEF DESCRIPTION OF THE DRAWINGS

The subject matter of the present disclosure will be more fully understood by reference to the following detailed description together with the accompanying drawings in which.

It is noted that for simplicity and clarity of illustration, elements shown in the figures have not necessarily been drawn to scale. Furthermore, where appropriate, reference numerals may be repeated among the figures to indicate corresponding or analogous elements.

DETAILED DESCRIPTION OF THE PRESENT INVENTION

Figure 1:
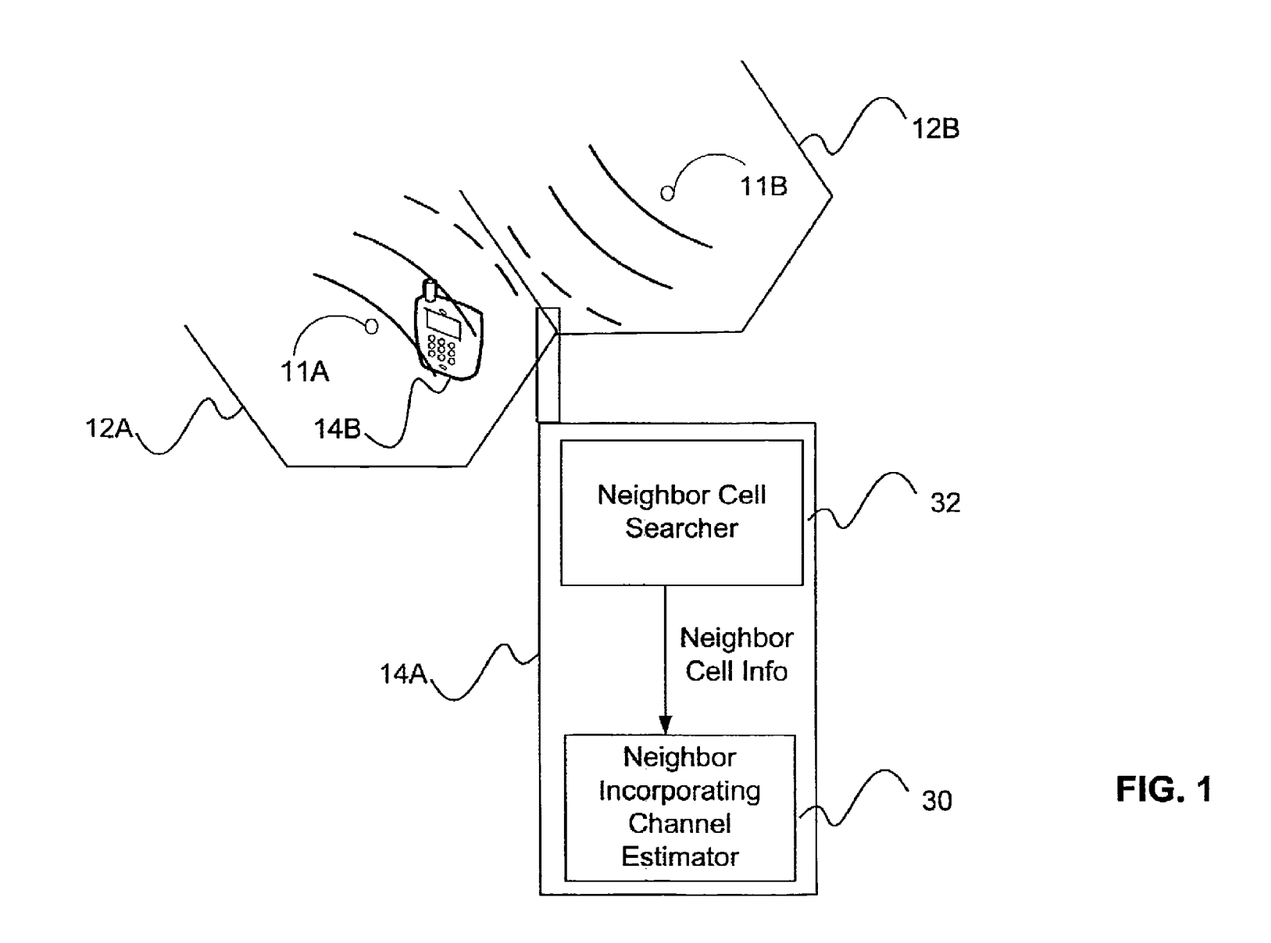
FIG. 1 is a schematic illustration of a set of cells of a cellular communications system and user equipment moving through the cells, constructed and operative in accordance with an embodiment.

Reference is now made to FIG. 1, which illustrates an example of a cellular communications system that includes two cells, cell 12A and cell 12B, which are each served by a respective base station 11. User equipment devices 14 may be situated at various locations in cells 12A and 12B, and may move within or between the cells. A different pilot signal is transmitted within each cell 12.

Cells may have a single transmitter or multiple transmitters. For the sake of clarity, the following explanation will assume a single transmitter per cell. An extension to multiple transmitters may be found at the end of the disclosure.

As seen in FIG. 1, device 14B receives a single reference signal since it is well within cell 12A. The channel estimation for device 14B may be relatively accurate since it has little noise interfering with the estimation.

On the other hand, device 14A is at the edge of cells 12A and 12B and thus may receive reference signals from both cell 12A and cell 12B, as indicated by the dashed lines. As device 14A moves into cell 12B, device 14A may receive the reference signal of cell 12B and may attempt to determine the channel qualities of cell 12B. Unfortunately, since device 14A is still at the edge of cell 12B, there may be significant interference from the reference signal transmitted by the transmitter in cell 14A.

Conventionally, the channel estimator of the user equipment models this interference as noise. However, in accordance with an embodiment and as shown in FIG. 1, user equipment devices 14 may comprise a neighbor incorporating channel estimator 30 which may utilize neighbor information, already determined by a neighbor cell searcher 32 forming part of most conventional user equipment devices.

Neighbor cell searcher 32 may facilitate mobility from one cell to another by determining the pilot patterns of neighboring transmitters, to prepare for switching to the next cell, whichever it may be. Neighbor cell searcher 32 may periodically search for signals from neighboring cells, may analyze their respective reference signals to determine which cells are most suitable for communication and, for selected signals, may determine their respective power levels and their scrambling or spreading sequences. In some instances, searcher 32 may associate each of the reference signals with the respective subcarriers on which the reference signals were transmitted. A suitable neighbor cell searcher that is compliant with emerging LTE and LTE advance standards is described in the book by Erik Dahlman et al., 3G Evolution HSPA and LTE for Mobile Broadband, 2nd edition, pages 421-425, for example.

In accordance with an embodiment, neighbor incorporating channel estimator 30 may incorporate various neighbor information into the channel estimation. For example, interfering signals, such as pilot signals that are received from neighboring transmitters, may be modeled rather than treated as white noise. By modeling interfering, neighboring signals, channel estimator 30 may improve its suppression of co-channel (i.e. neighbor) reference signals to thereby produce an improved, channel estimation. The neighbor information may include, for example, the power, the spreading sequences, the scrambling sequences, or other suitable information that distinguishes the reference signals of the different cells.

Figure 2:
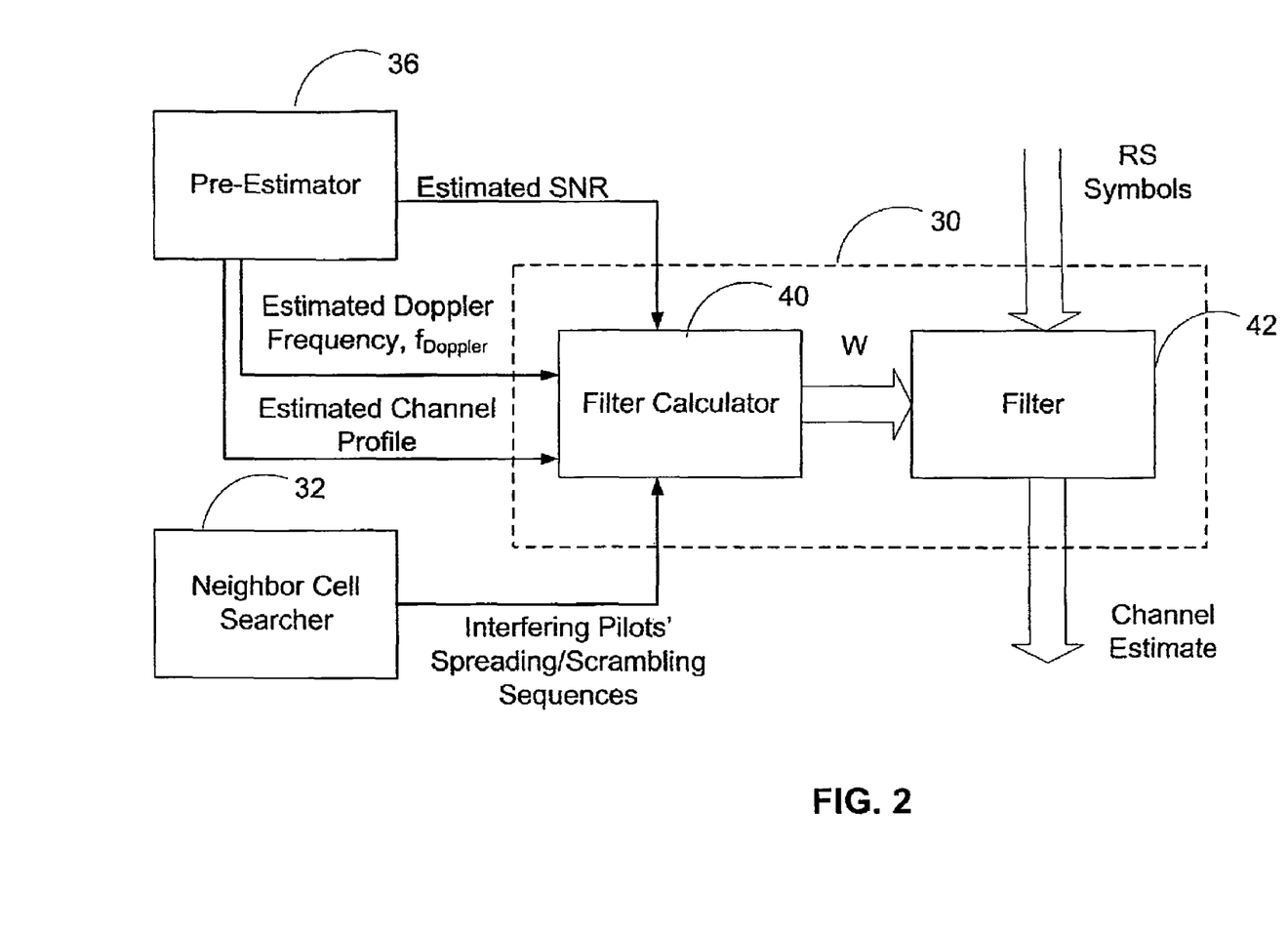
FIG. 2 is a block diagram illustrating a channel estimator, useful in the communications system of FIG. 1.

Reference is now made to FIG. 2, which is a block diagram illustrating channel estimator 30. In accordance with an embodiment, channel estimator 30 receives inputs from neighbor cell searcher 32 and a pre-estimator 36, as shown. Channel estimator 30 may comprise, for example, an MMSE (minimum mean square error) filter calculator 40, to estimate the appropriate filters from the information it receives from searcher 32 and pre-estimator 36, and an MMSE filter 42 that employs the filter calculated by MMSE filter calculator 40 to filter incoming reference signals to determine the channel estimate $\hat{h}_0$.

Pre-estimator 36 may determine a signal to noise ratio (SNR) of the current reference signal (i.e. the reference signal of the currently active cell), a Doppler frequency $f_{doppler}$ of the current reference signal and an estimated channel profile.

MMSE filter calculator 40 may be designed, for instance, for cellular OFDMA (orthogonal frequency division multiple access) systems, such as LTE, in which the reference signals of the cells are synchronized up to a cyclic prefix length (i.e. only their prefixes differ), and each cell uses the same frequencies. Each cell i has its own reference signal with its own, unique spreading or scrambling sequence $S_i$, and different cells may have different channel gains $g_i$.

Moreover, in OFDMA, each user equipment device is assigned a plurality of "sub-carrier" frequencies upon which to transmit. At each transmission time (known as an "OFDM symbol"), the devices transmit on their currently assigned frequency, typically changing to another frequency for the next transmission time. A "sub-frame" may typically include multiple transmissions, such as 14 transmissions. Thus, each frame may comprise a block of multiple frequencies by multiple time stamps and the devices are assigned a plurality of time-frequency (T/F) "bins". To generate a received signal, the devices may order the received data in the form of a T/F matrix.

The reference signals of some of the cells may be assigned to transmit during the same time-frequency bins. However, as discussed hereinabove, each reference signal has its own spreading or scrambling sequences $S_i$.

Each cell i transmits its reference signal, defined by its spreading/scrambling sequence $s_i$. The path through which the transmitted signal travels to reach the user equipment device affects the received signal, both by changing its power (or gain $g_i$) and by distorting the signal, where the distortion is known as the channel $h_i$. Thus, the signal reaching the user equipment from cell i is $g_i \cdot S_i \cdot \bar{h}_i$ where:

$g_i$ is the gain of cell i;

$S_i$ is a diagonal matrix with the spreading or scrambling sequences $S_i$ for the reference signal from cell i (each transmitted symbol of the reference signal is assumed to have a value of the diagonal $S_i$); and $\bar{h}_i$ is the channel response of the transmission (Tx) antenna of cell i to the reception (Rx) antenna of the user equipment device at the T/F bins assigned to the reference signals ($\bar{h}_i$ is typically normalized to unity power).

In accordance with an embodiment, channel estimator 30 may be designed to model all of the reference signals arriving to it, thus:

$$\bar{y} = \sum_{i=0}^{NumCells-1} g_i \cdot S_i \cdot \bar{h}_i + \bar{n} \qquad \text{Equation 1}$$

where:

$\bar{y}$ is a vector of the received reference signal data;

$\bar{n}$ is any remaining noise at the T/F bins assigned to the reference signal; and NumCells is the number of cells that are assumed in the multi-cell model where, without loss of generality, the $0^{th}$ cell is the cell having the desired transmitter transmitting the reference signal of interest. In general, only the neighboring cells will be included in the model. Typically, these are the neighboring cells which neighbor cell searcher 32 has deemed to be significant and thus, are expected to have interfering reference signals.

It is noted that equation 1 models the reference signals of neighboring cells rather than considering them sources of noise. The noise element $\bar{n}$ merely models additional noise sources whose properties are unknown.

The standard LMMSE (Linear Mean Square Error) solution to an equation of the style of equation 1 is:

$$\hat{h}_0 = W \cdot \bar{y}$$

$$W = R_{yy}^{-1} \cdot R_{yh}$$

$$R_{yy} = E\{\bar{y} \cdot \bar{y}^+\}$$

$$R_{yh} = E\{\bar{y} \cdot g_0 \cdot \bar{h}_0^+\} \qquad \text{Equation 2}$$

Where, if X is a general term for a matrix, $X^{-1}$ is the inverse of matrix X and $X^+$ is the conjugate transpose of matrix X;

$\hat{h}_0$ is the desired output, the estimate for the channel from the $0^{th}$ cell, the cell of interest;

$R_{yy}$ is an autocorrelation matrix of the received reference signal data;

$R_{yh}$ is a cross-correlation matrix of received signal with channel; and

W is the signal filter matrix for MMSE filter 42.

It is noted that, in equation 2, the reference signals from the other cells (cells 1-NumCells-1) implicitly affect the correlation matrices $R_{yy}$ and $R_{yh}$. The present disclosure describes an example solution for estimating $R_{yy}$ and $R_{yh}$ and, from them, for estimating the channel estimate $\hat{h}_0$.

As can be seen in the following equations 3-5, autocorrelation matrix $R_{yy}$ may be defined from the gains $g_i$ of each cell, the sequence matrices $S_i$, an autocorrelation matrix $R_{hh}$ of the channel estimate (which will be determined later), and a noise variance $\sigma_n$. The matrix $R_{yh}$ may be defined from the gain, $g_0$, of the cell of interest, the sequence matrix $S_0$ of the cell of interest and the channel autocorrelation matrix $R_{hh}$.

$$R_{yy} = E\{\bar{y} \cdot \bar{y}^+ \mid g_i, i = 0, 1, 2, \ldots, NumCells - 1\} = \qquad \text{Equation 3}$$

$$\sum_{i=0}^{NumCells-1} p_i \cdot S_i \cdot R_{hh}(i) \cdot S_i^+ +$$

$$\sum_{i=0}^{NumCells-1} \sum_{\substack{j=0 \\ j \neq i}}^{NumCells-1} g_i \cdot g_j \cdot S_i \cdot E\{\bar{h}_i \cdot \bar{h}_j^+\} \cdot S_j^+ + \sigma_n^2 \cdot I$$

Equation 3 may be simplified by assuming that the channels from different cells are "uncorrelated" (i.e. not related to one another). Another simplification assumes that the channels from all the transmitters have the same general correlation matrix $R_{hh}$ rather than individual channel correlation matrices $R_{hh}(i)$. Thus:

$$E\{\bar{h}_i \cdot \bar{h}_j^+\} = R_{hh} \cdot \delta_{i-j}$$

$$R_{hh} = R_{hh}(i) = E\{\bar{h}_i \cdot \hat{h}_i^+\}, i = 0, 1, 2, \ldots, NumCells-1 \qquad \text{Equation 4}$$

These assumptions may be particularly suitable when all the modeled reference signals are transmitted from the same geographical site but may be utilized when the signals are from neighboring cells.

With the assumptions of equation 4, equation 3 may be rewritten as:

$$R_{yy} = \sum_{i=0}^{NumCells-1} p_i \cdot S_i \cdot R_{hh} \cdot S_i^+ + \sigma_n^2 \cdot I \qquad \text{Equation 5}$$

$$R_{yh} =$$
$$E\{\bar{y} \cdot g_0 \cdot \bar{h}_0^+ \mid g_i, i = 0, 1, 2, \ldots, NumCells - 1\} = p_0 \cdot S_0 \cdot R_{hh}$$

$$p_i = g_i^2$$

where $p_i$ is the power of the signal from cell i.

Gain (Power) and Noise Variance Estimation

In order to determine the correlation matrices $R_{yy}$ and $R_{yh}$ of equation 5, filter calculator 40 may first estimate the power $p_i$ of each cell from the spreading/scrambling sequences $S_i$ (in the form of the matrix $S_i$). For example, a Least Squares based approach may be utilized. It gives, as a by product, also an estimate of the noise variance $\sigma_n$.

Repeating equation 5 for $R_{yy}$:

$$R_{yy} = \qquad \text{Equation 6}$$
$$\sum_{i=0}^{NumCells-1} p_i \cdot S_i \cdot R_{hh} \cdot S_i^+ + \sigma_n^2 \cdot I = \sum_{i=0}^{NumCells-1} p_i \cdot B_i + \sigma_n^2 \cdot I$$

$$B_i = S_i \cdot R_{hh} \cdot S_i^+$$

Assuming that the channels vary slowly, channel autocorrelation $R_{hh}$ also varies slowly, and thus, the channel autocorrelation $R_{hh}$ from the previous estimation may be utilized to determine $B_i$. Equation 6 may be rewritten using only the 1$^{st}$ column of each matrix in equation 6.

$$\hat{r}_{yy} = \sum_{i=0}^{NumCells-1} p_i \cdot \bar{b}_i + \qquad \text{Equation 7}$$

$$\sigma_n^2 \cdot \bar{e} = \begin{bmatrix} \bar{b}_0 & \bar{b}_1 & \ldots & \bar{b}_{NumCells-1} & \bar{e} \end{bmatrix} \cdot \begin{bmatrix} p_0 \\ p_1 \\ \vdots \\ p_{NumCells-1} \\ \sigma_n^2 \end{bmatrix} =$$

$$A \cdot \bar{\theta}$$

where $$\bar{e} = \begin{bmatrix} 1 \\ 0 \\ \vdots \\ 0 \end{bmatrix}, \qquad \text{Equation 8}$$

$$A = \begin{bmatrix} \bar{b}_0 & \bar{b}_1 & \ldots & \bar{b}_{NumCells-1} & \bar{e} \end{bmatrix},$$

$$\bar{\theta} = \begin{bmatrix} p_0 \\ p_1 \\ \vdots \\ p_{NumCells-1} \\ \sigma_n^2 \end{bmatrix}$$

The least squares solution for that case is:

$$\hat{\theta}_{LS} = (A^+ \cdot A)^{-1} \cdot A^+ \cdot \tilde{r}_{yy} \qquad \text{Equation 9}$$

where, as per equation 8, $\hat{\theta}_{LS}$ is a vector of the estimated powers $p_i$ and the noise variance $\sigma_n^2$ and the $\tilde{r}_{yy}$ from the previous estimation is utilized. It is noted that equation 9 utilizes an empirical value for the 1$^{st}$ column vector $r_{yy}$. For example, a vector may be some combination of the 1$^{st}$ column of the previous estimate of $R_{yy}$ and the current empirical estimation.

Given the per-cell gains $g_i$ (or power $p_i$) and the per-symbol noise variance $\sigma_n^2$, generated from equation 9, channel correlation matrix $R_{hh}$ matrix may be estimated, as described hereinbelow.

Assuming that the channel and the received reference signal can be modeled as stationary processes (i.e. their statistics do not change over time), the (i,j)th element of $R_{hh}$ may be denoted by:

$$[R_{hh}]_{ij} = E\{h(t_i, f_i) \cdot h^*(t_j, f_j)\} = r_h(t_i - t_j, f_i - f_j) \qquad \text{Equation 10}$$

where $(t_i, f_i)$ are the time offset and frequency offset of the (i,j)th element of $R_{hh}$, respectively. The assumption that the paths of the reference signals are independent leads to the separability of the time and frequency correlations, $r_h^t(\Delta t)$ and $r_h^f(\Delta f)$, respectively, as follows:

$$r_h(\Delta t, \Delta f) = r_h^t(\Delta t) \cdot r_h^f(\Delta f) \qquad \text{Equation 11}$$

A consequence of the channel gain parameterization is that:

$$r_h^t(0) = 1$$

$$r_h^f(0) = 1 \qquad \text{Equation 12}$$

Channel Time Correlation Estimation One approach to determine the time offset is to determine a time correlation of fading channels, known as Rayleigh fading. The "Jakes Model" (described in the Wikipedia article on "Rayleigh fading" of Nov. 9, 2008) models time correlation as a Bessel function $J_0$ of the 1$^{st}$ kind. Filter calculator 40 may calculate the time correlation $r_h^t(\Delta t)$ as follows:

$$r_h^t(\Delta t) = J_0(2 \cdot \pi \cdot f_{Doppler} \cdot \Delta t) = \qquad \text{Equation 13}$$
$$\sum_{k=0}^{\infty} (-1)^k \cdot \frac{(0.25 \cdot (2 \cdot \pi \cdot f_{Doppler} \cdot \Delta t)^2)^k}{(k!)^2}$$

where the only parameter required to effect this calculation is $f_{Doppler}$, and $f_{Doppler}$ may be generated by pre-estimator 36. Pre-estimator 36 may generate a matrix of values of $r_h^t(\Delta t)$, for different values of $\Delta t$, for example, of 0, 1, 2 . . . seconds.

Figure 3:
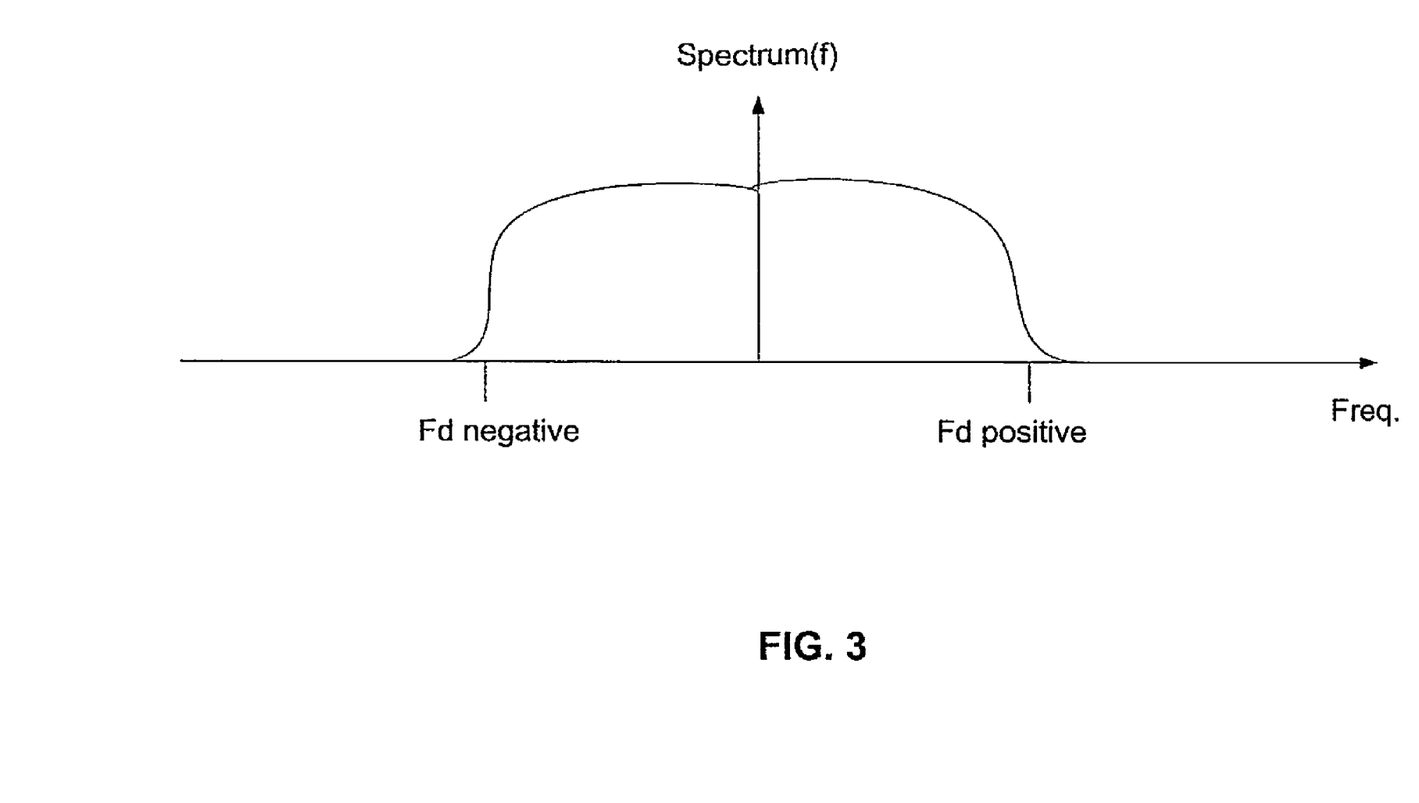
FIG. 3 is a schematic illustration useful in understanding an estimation of $f_{Doppler}$, forming part of the channel estimator of FIG. 2.

Reference is briefly made to FIG. 3, which illustrates one suitable approach that may be used by pre estimator 36 for estimating $f_{Doppler}$. The process may include the following steps:

1. Estimate the spectrum of the reference signal in the time domain. The result is shown in FIG. 3.
2. Define Fdnegative and Fdpositive as the frequencies that have 90% of the power in the negative and positive regions of the spectrum.
3. Estimate $f_{Doppler}$ to be the frequency that is the maximum of the values of Fdnegative and Fdpositive:

$$f_{Doppler} = \max(\|Fd\text{negative}\|, Fd\text{postive}) \qquad \text{Equation 14}$$

Channel Frequency Correlation Estimation

One approach for the frequency correlation is motivated by a discrete multipath model for the channel. The model results in the following expression:

$$r^f = (\Delta f) = r^f\left(\Delta k \frac{f_s}{N}\right) = E\{H(k_1) \cdot H^*(k_1 + \Delta k)\} =$$

Equation 15

$$E\left\{\sum_{l=0}^{N_{Paths}-1} h_l \cdot e^{-\frac{j2\pi k_1 \tau_l}{NT_s}} \cdot \sum_{m=0}^{N_{Paths}-1} h_m^* \cdot e^{\frac{j2\pi(k_1+\Delta k)\tau_m}{NT_s}}\right\}$$

$$E\{h_l h_m^*\} = E\{|h_l|^2\}\delta_{l-m} = \sigma_l^2 \delta_{l-m}$$

$$\Downarrow$$

$$= \sum_{l=0}^{N_{Paths}-1} \sigma_l^2 \cdot e^{-\frac{j2\pi\Delta k\tau_l}{NT_s}} = \sum_{l=0}^{N_{Paths}-1} \sigma_l^2 \cdot e^{-j2\pi\Delta f \tau_l}$$

Where:

$\tau_l$ is the l'th path delay spread;

$\sigma_l^2$ is the l'th path power;

$\Delta k$ is a multiplier of $$\frac{f_s}{N};$$

and $$T = \frac{1}{f_s}$$

For example, one solution for determining the frequency correlation may be based on a time tracking operation in the time domain. The resultant equation is:

$$\hat{r}^f(\Delta f) = \sum_{l=0}^{N_{TT}-1} \hat{\sigma}_l^2 \cdot e^{-j2\pi\Delta f \tau_l}$$

Equation 16

Figure 4:
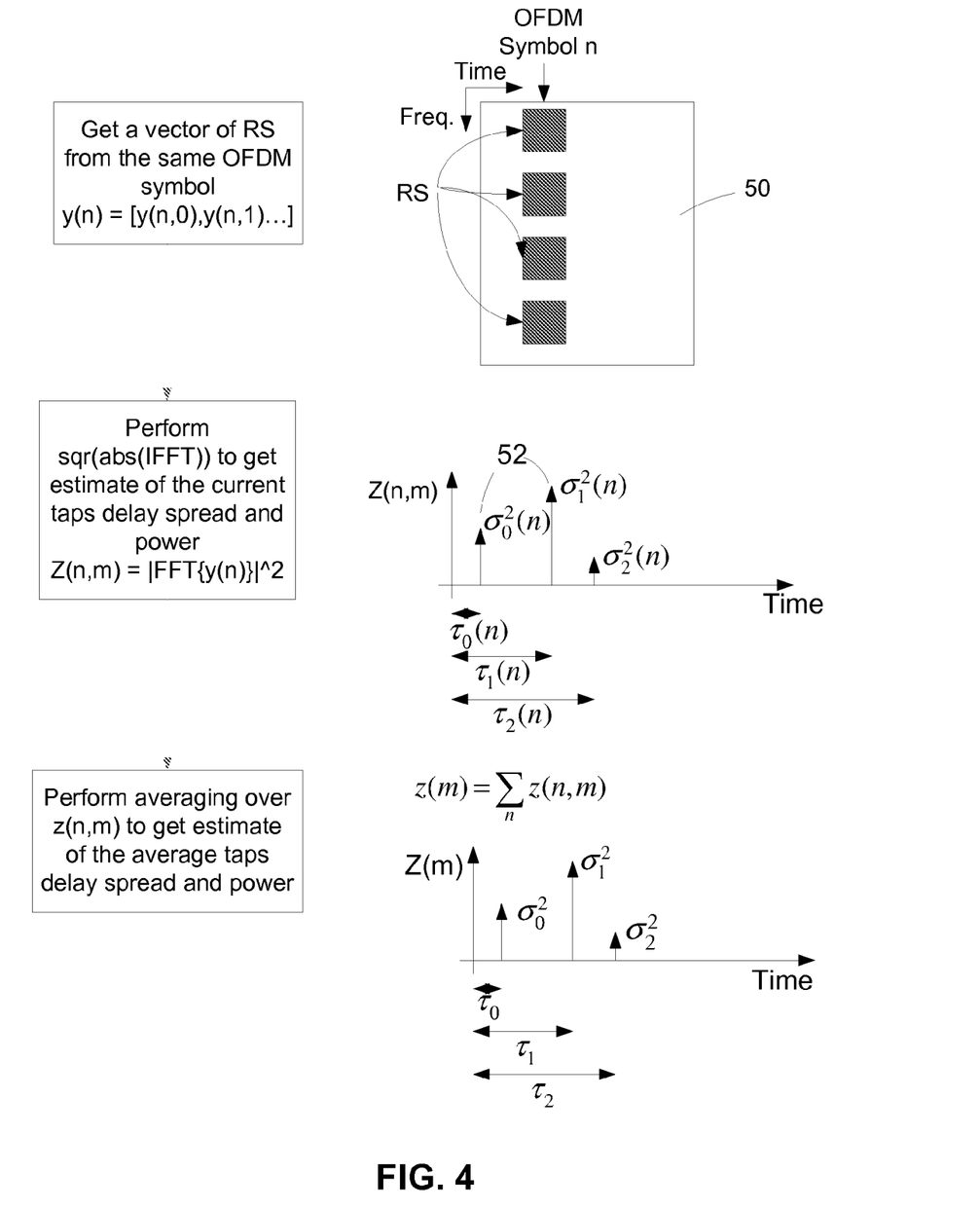
FIG. 4 is a schematic illustration useful in understanding an estimation of a channel profile, forming part of the channel estimator of FIG. 2.

Reference is briefly made to FIG. 4, which illustrates one suitable approach that may be used by pre-estimator 36 for estimating the path delays and path powers, which, together, form the channel profile. The process may include the following steps:

1. Create a vector y(n) of the reference signal (RS) from one OFDM symbol n, over time (shown in box 50)
2. Perform sqr(abs(IFFT)) (i.e. perform an IFFT (inverse fast fourier transform), take the absolute value of each component and then square them). This produces a multiplicity of spikes 52, one per path 1. The amplitude of each spike 52 is its power $\sigma_l^2$ and its distance from zero is its delay $\tau_l$.
3. Average the results for multiple OFDM symbols n to produce the power and delay values for equation 16.

Equation 13 gives the time correlation $r_h^t(\Delta t)$ and equation 16 provides the frequency correlation $r_h^f(\Delta f)$. Filter calculator 40 may insert the time correlation and the frequency correlations into equation 10 to generate a time, frequency matrix $R_{hh}$.

Based on the matrix $R_{hh}$, the estimated powers $p_i$ and the known sequences $S_i$, filter calculator 40 may construct the $R_{yy}$ and $R_{yh}$ matrices, as follows:

$$R_{yy} = \sum_{i=0}^{NumCells-1} p_i \cdot S_i \cdot R_{hh} \cdot S_i^+ + \sigma_n^2 \cdot I$$

Equation 17

$$R_{yh} = p_0 \cdot S_0 \cdot R_{hh}$$

As can be seen from the above description, autocorrelation matrix $R_{yy}$ and correlation matrix $R_{yh}$ may incorporate models of neighboring reference signals (i.e. equation 16 sums the models of reference signals from the current cell (i=0) and from the remaining cells (i=1,NumCells-1)).

Filter calculator 40 may estimate the filter as $W=R_{yy}^{-1}\cdot R_{yh}$ and may provide filter matrix W to filter 42. Filter 42 may then utilize matrix W as described in equation 2 to generate the estimated channel $\hat{h}_0$ from the received symbols $\bar{y}$. The equation is repeated hereinbelow:

$$\hat{h}_0 = W\bar{y}$$

Equation 18

Thus, signal filter W and channel estimate $\hat{h}_0$ also incorporate the models of the neighboring reference signals.

Figure 5:
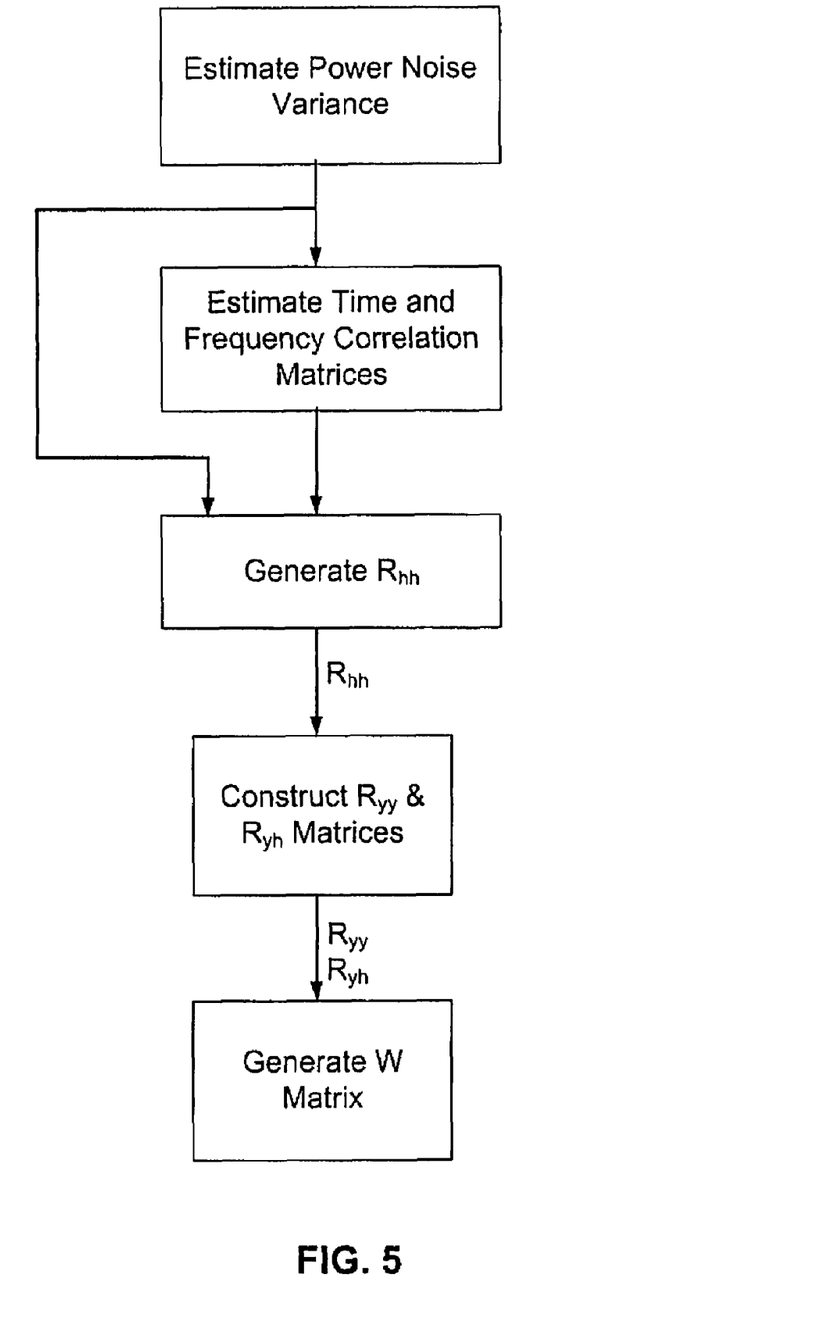
FIG. 5 is a block diagram illustration of the operations of a filter calculator forming part of the channel estimator of FIG. 2.

FIG. 5, to which reference is now made, summarizes the operations of filter calculator 40, as follows:

1. Estimate the power transmitted by each cell i along with the noise variance;
2. Estimate the time and frequency correlation matrices;
3. Generate the $R_{hh}$ channel correlation matrix from the time and frequency correlation matrices;
4. Use the estimated powers $p_i$ and the known sequences $s_i$ to construct the $R_{yy}$ and $R_{yh}$ correlation matrices; and
5. Calculate the signal filter to be $W=R_{yy}^{-1}\cdot R_{yh}$ It is noted that the present invention may provide an improved channel estimation in the presence of interfering, possibly co-channel, reference signals and may be particularly useful in OFDMA based cellular telecommunication systems. Interference caused by the neighboring reference signals is modeled, rather than considered as white noise.

It is noted that the equations provided herein are applicable to cells having a single transmitter, as described hereinabove, or to cells having more than one transmitter. For the latter, the transmitters participating in the calculation are numbered from 1 to NumCells, irrespective of how many transmitters are in each cell. The calculations and assumptions described herein do not change.

It is further noted that equation 1 may be solved using other types of estimators. For example, an MMSE (Minimum Mean Square Error) estimator, which is not necessarily linear, may be considered.

Embodiments of the present invention may include apparatus for performing the operations herein. This apparatus may be especially constructed for desired purposes, for example, a dedicated processor may be provided in a suitable user equipment device that communicates on a cellular telecommunications network, or other suitable network such as WiMax and the like. In other embodiments, the apparatus may comprise a general-purpose computer selectively activated or reconfigured by a computer program stored in the computer. Such a computer program may be stored in a computer readable storage medium, which may be any type of media suitable for storing electronic instructions and capable of being coupled to a computer system bus.

It is noted that none of the embodiments of the present invention are described with reference to any particular programming language. A variety of suitable programming languages may be used to implement the teachings this disclosure.

While certain features of the disclosure have been illustrated and described herein, various modifications, substitutions, changes, and equivalents may occur to those of ordinary skill in the art without departing from the scope of the invention as claimed hereinbelow.

What is claimed is:

1. A method for a user equipment device, the method comprising:
   receiving a reference signal from a desired transmitter;
   obtaining information about at least one interfering transmitter whose signals are receivable by said user equipment device, said information including a reference signal sequence of a reference signal transmitted by said at least one interfering transmitter;
   calculating filtering characteristics of a signal filter based on the information obtained about the at least one interfering transmitter, said calculating comprising:
     estimating a power of signals transmitted by said desired and said interfering transmitter, a noise variance, and time and frequency correlation matrices;
     generating a channel correlation matrix from said time and frequency correlation matrices;
     constructing an autocorrelation matrix of the received reference signal and a cross-correlation matrix of said received signal with said channel from said estimated power, said noise variance and said reference signal sequence for said interfering transmitter; and
     generating said signal filter from said autocorrelation matrix and said cross-correlation matrix;
   applying said signal filter using said calculated filtering characteristics to filter said received reference signal; and
   generating a channel estimate for a channel between said user equipment device and said desired transmitter using said received reference signal and said information.

2. The method according to claim 1 wherein said reference signal sequence is at least one of a scrambling sequence and a spreading sequence.

3. The method according to claim 1 wherein said calculating comprises generating a LMMSE (linear minimum mean square error) estimator.

4. The method according to claim 1 wherein said reference signal is an OFDMA (orthogonal frequency division multiple access) signal.

5. The method according to claim 1 wherein said user equipment device is an LTE (long term evolution) device.

6. The method according to claim 1 wherein said obtaining comprises using an output of a neighbor cell searcher forming part of said user equipment device.

7. The method according to claim 1 wherein said at least one interfering transmitter is located in one of the following: within the same cell and within different cells.

8. A method for a user equipment device, the method comprising:
   receiving a reference signal from a desired transmitter;
   obtaining information about at least one interfering transmitter whose signals are receivable by said user equipment device, said information including a reference signal sequence of a reference signal transmitted by said at least one interfering transmitter; and
   calculating filtering characteristics of a signal filter based on the information obtained about the at least one interfering transmitter, said calculating comprising:
     estimating a power of signals transmitted by said desired and said interfering transmitter, a noise variance and time and frequency correlation matrices;
     generating a channel correlation matrix from said time and frequency correlation matrices;
     constructing an autocorrelation matrix of the received reference signal and a cross-correlation matrix of received signal with channel from said estimated power, said noise variance and said reference signal sequence for said interfering transmitter; and
     generating said signal filter from said autocorrelation matrix and said cross-correlation matrix; and
   applying said signal filter using said calculated filtering characteristics to filter said received reference signal to model interference caused by said reference signals of said at least one interfering transmitter on said received reference signal when determining a channel estimate for a channel between said user equipment device and said desired transmitter.

9. The method according to claim 8 wherein said reference signal sequence is at least one of a scrambling sequence and a spreading sequence.

10. The method according to claim 8 wherein said calculating comprises generating a LMMSE (linear minimum mean square error) estimator.

11. The method according to claim 8 wherein said reference signal is an OFDMA (orthogonal frequency division multiple access) signal.

12. The method according to claim 8 wherein said user equipment device is an LTE (long term evolution) device.

13. The method according to claim 8 wherein said obtaining comprises using an output of a neighbor cell searcher forming part of said user equipment device.

14. The method according to claim 8 wherein said at least one interfering transmitter is located in one of the following: within the same cell and within different cells.

15. A user equipment device comprising:
   a receiver to receive a reference signal from a desired transmitter;
   a neighbor cell searcher to obtain information about at least one interfering transmitter whose signals are receivable by said user equipment device, said information including a reference signal sequence of a reference signal transmitted by said at least one interfering transmitter; and
   an estimator including a filter calculator to calculate filtering characteristics of a signal filter based on the information obtained about the at least one interfering transmitter, said filter calculator comprising:
     an estimator to estimate a power of signals transmitted by said desired and said interfering transmitter, a noise variance and time and frequency correlation matrices;
     a channel correlation generator to generate a channel correlation matrix from said time and frequency correlation matrices;
     a matrix constructor to construct an autocorrelation matrix of the received reference signal and a cross-correlation matrix of received signal with channel from said estimated power, said noise variance and said reference signal sequence for said interfering transmitter; and
     a filter generator to generate said signal filter from said autocorrelation matrix and said cross-correlation matrix,
   said signal filter using said calculated filtering characteristics to filter said received reference signal, the estimator to generate a channel estimate for a channel between said user equipment device and said desired transmitter using said received reference signal and said information.

16. The device according to claim 15 wherein said reference signal sequence is at least one of a scrambling sequence and a spreading sequence.

17. The device according to claim 15 wherein said filter calculator is an LMMSE (linear minimum mean square error) estimator.

18. The device according to claim 15 wherein said reference signal is an OFDMA (orthogonal frequency division multiple access) signal.

19. The device according to claim 15 wherein said user equipment device is an LTE (long term evolution) device.

20. The device according to claim 15 wherein said at least one interfering transmitter is located in one of the following: within the same cell and within different cells.

21. A user equipment device comprising:
  a receiver to receive a reference signal from a desired transmitter;
  a neighbor cell searcher to obtain information about at least one interfering transmitter whose signals are receivable by said user equipment device, each said information including a reference signal sequence of a reference signal transmitted by said at least one interfering transmitter; and
  a modeler including a filter calculator to calculate filtering characteristics of a signal filter based on the information obtained about the at least one interfering transmitter, said filter calculator comprising:
    an estimator to estimate a power of signals transmitted by said desired and said interfering transmitter, a noise variance and time and frequency correlation matrices;
    a channel correlation generator to generate a channel correlation matrix from said time and frequency correlation matrices;
    a matrix constructor to construct an autocorrelation matrix of the received reference signal and a cross-correlation matrix of received signal with channel from said estimated power, said noise variance and said reference signal sequence for said interfering transmitter; and
    a filter generator to generate said signal filter from said autocorrelation matrix and said cross-correlation matrix,
  said signal filter using said calculated filtering characteristics to filter said received reference signal, the modeler to model interference caused by said reference signals of said at least one interfering transmitter on said received reference signal when determining a channel estimate for a channel between said user equipment device and said desired transmitter.

22. The device according to claim 21 wherein said reference signal sequence is at least one of a scrambling sequence and a spreading sequence.

23. The device according to claim 21 wherein said filter calculator is an LMMSE (linear minimum mean square error) estimator.

24. The device according to claim 21 wherein said reference signal is an OFDMA (orthogonal frequency division multiple access) signal.

25. The device according to claim 21 wherein said user equipment device is an LTE (long term evolution) device.

26. The device according to claim 21 wherein said at least one interfering transmitter is located in one of the following: within the same cell and within different cells.

* * * * *